United States Patent [19]
DeAndrea

[11] 3,835,298
[45] Sept. 10, 1974

[54] DEVICE FOR DEMONSTRATING AND CALCULATING MATHEMATICAL FUNCTIONS

[76] Inventor: Joseph D. DeAndrea, 349 S. Aiken Ave., Pittsburgh, Pa. 15232

[22] Filed: Aug. 15, 1973

[21] Appl. No.: 388,460

[52] U.S. Cl. ............... 235/61 GM, 33/76 V, 35/34
[51] Int. Cl. ............................................. G06g 1/00
[58] Field of Search ......... 235/61 GM, 61 B; 35/34; 33/76 V, 174 S, 174 TC

[56] References Cited
UNITED STATES PATENTS

| | | | |
|---|---|---|---|
| 1,955,392 | 4/1934 | Shimberg | 33/76 V |
| 2,736,491 | 2/1956 | Potter | 235/61 GM |
| 3,021,058 | 2/1962 | Horton | 235/61 B |

*Primary Examiner*—Stephen J. Tomsky
*Attorney, Agent, or Firm*—Webb, Burden, Robinson & Webb, P.A.

[57] ABSTRACT

A device for demonstrating and calculating mathemetical functions comprising a planar member having a unit circle inscribed thereon and a 90° angular scale associated therewith to indicate the angle of an arc measured within one quadrant of the unit circle. The planar member also includes perpendicularly extending ordinate and abscissa axes positioned with their point of intersection at the origin of the unit circle. Numerical indicia are associated with each axis to indicate sine, cosine, versine and coversine values. A cursor member carrying a radius vector hairline inscribed thereon is pivotally mounted within the open interior of the planar member at the origin of the unit circle with the radius vector hairline passing through the origin. A flat, transparent indicator member having two intersecting perpendicular hairlines inscribed thereon is pivotally mounted within the interior portion of the planar member to the cursor member. Alignment means is provided to maintain a perpendicular relationship between the hairlines of the indicator member with the abscissa and ordinate axes when said cursor member and flat indicator member are moved through a quadrant of the unit circle thus permitting visual observation of the sine and cosine values of an inscribed angle at the points of intersection of the pair of perpendicular hairlines with the ordinate and abscissa axes respectively. My device may also include segmental central angle indicia, arc indicia and chord indicia whereby the segmental central angle of any inscribed angle within a quadrant of the unit circle may be determined along with the length of arc and length of chord for said segmental central angle.

5 Claims, 4 Drawing Figures

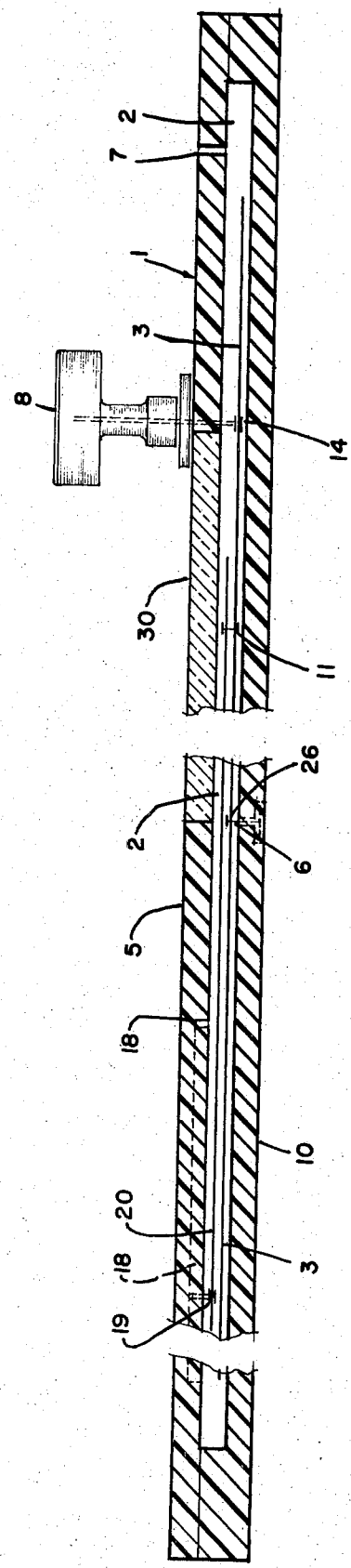
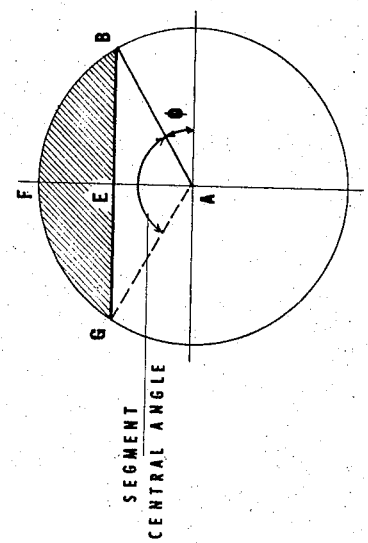
FIG. 3
FIG. 4
FIG. 5

DEVICE FOR DEMONSTRATING AND CALCULATING MATHEMATICAL FUNCTIONS

My invention relates to a device which is useful for demonstrating and calculating mathematical functions. More particularly, my invention relates to a device which may be used for demostrating and calculating sine, cosine, versine and coversine functions. My invention also relates to device which is useful for calculating the segmental central angle relating to an angle inscribed within one quadrant wherein the arc and chord lengths for a given segmental angle are also calculated. The student of trigonometry is often times confused by the interaction between the various trigonometric functions. I have found that the study of trigonometry is made much easier if the student, at the outset, can visually conceive the relationship of the various trigonometric functions relative to one another and to the basic unit circle. Prior devices have attempted to solve this problem but have failed since many of these prior devices are relatively complex to operate and only serve to add to the student's problem.

My invention solves the problem heretofore encountered by providing a device which visually demonstrates the variable functions of trigonometry within the basic unit circle in a manner which is easily understood and also simple to operate. My invention further provides a device which is useful as an instructional tool in the classroom and a device which is also useful as a calculator, whereby the user may easily obtain the particular numerical values for sines, cosines, coversines, versines, segmental angles, and their respective arcs and chords.

My invention provides a device which includes alignment means to maintain the perpendicular alignment between the sine and cosine indicator hairlines and their respective ordinate and abscissa axes so as to decrease the probability of confusion or mistake resulting from the use by an inexperienced student.

Briefly. my invention provides a device for demonstrating and calculating trigonometric functions comprising a planar member having a unit circle inscribed thereon and an angular scale associated with the unit circle to indicate the angle of an arc measured within at least one quadrant thereof. The planar member also has a vertically extending ordinate axis and a horizontally extending abscissa axis, each extending outwardly from the origin of the unit circle. Numerical indicia for indicating sine and cosine values are associated with each of said axes, linearly calibrated from 0 at the origin to 1 at the perimeter of the circle. Additional numerical indicia for indicating versine and coversine values may also be included along each of the axes, said additional indicia being linearly calibrated from 1 at the origin of the circle to 0 at its perimeter. The planar member has an open interior portion between its upper and lower flat surfaces for placement of a cursor member. The cursor member carries a radius vector hairline which is visually observable within at least one quadrant of the circle, pivotally mounted at the origin of the unit circle with the radius vector hairline passing through said origin. A transparent indicator member is also provided. The indicator member has having two intersecting hairlines thereon and is pivotally mounted at the point of intersection of the hairlines to the radius vector hairline, one unit length from the origin of the unit circle. The planar member also has a pair of alignment tracks positioned within the interior portion of the upper surface in spaced apart relationship thereon, said tracks being formed to describe 90° arcs of the unit circle. The flat indicator member also has a pair of alignment pins attached thereto and movably positioned within each of the alignment tracks to maintain the angular alignment of the flat indicator member whereby the pair of hairlines remain perpendicular to the ordinate and abscissa axes respectively when the cursor member and flat indicator member are moved through a quadrant of unit circle. The pair of intersecting perpendicular lines of the indicator member and the radius vector hairline of the cursor member are visually observable within at least one quadrant of the unit circle to permit visual observation of the sine and cosine values and the coversine and versine values of an inscribed angle at the points of intersection of the pair of perpendicular hairlines with the ordinate and abscissa axes respectively. The device may also preferably contain an angular scale to indicate the segmental central angle relating to angles inscribed within a quadrant of the unit circle. The segmental central angle scale is calibrated from 0°–180° and positioned in a quadrant of the unit Said central angle scale is calibrated from 0° to 180° within one quadrant of said circle. Associated with said central angle scale are arc and chord length indicia calibrated from 0 at the 0° end of the central angle scale to 3.1416 and 2.000 respectively at the 180° end. In this embodiment, the radius vector hairline extends into the quadrant of the central angle scale to permit visual observation of the radius vector hairline adjacent the scale, whereby, the arc length and chord length of the given segmental central angle may be visually determined.

In the drawings:

FIG. 3 is a partially exploded view similar to that of FIG. 2; and

FIG. 4 is a diagram of the unit circle showing the segmental central angle, chord and arc of said central angle.

Figure 1:
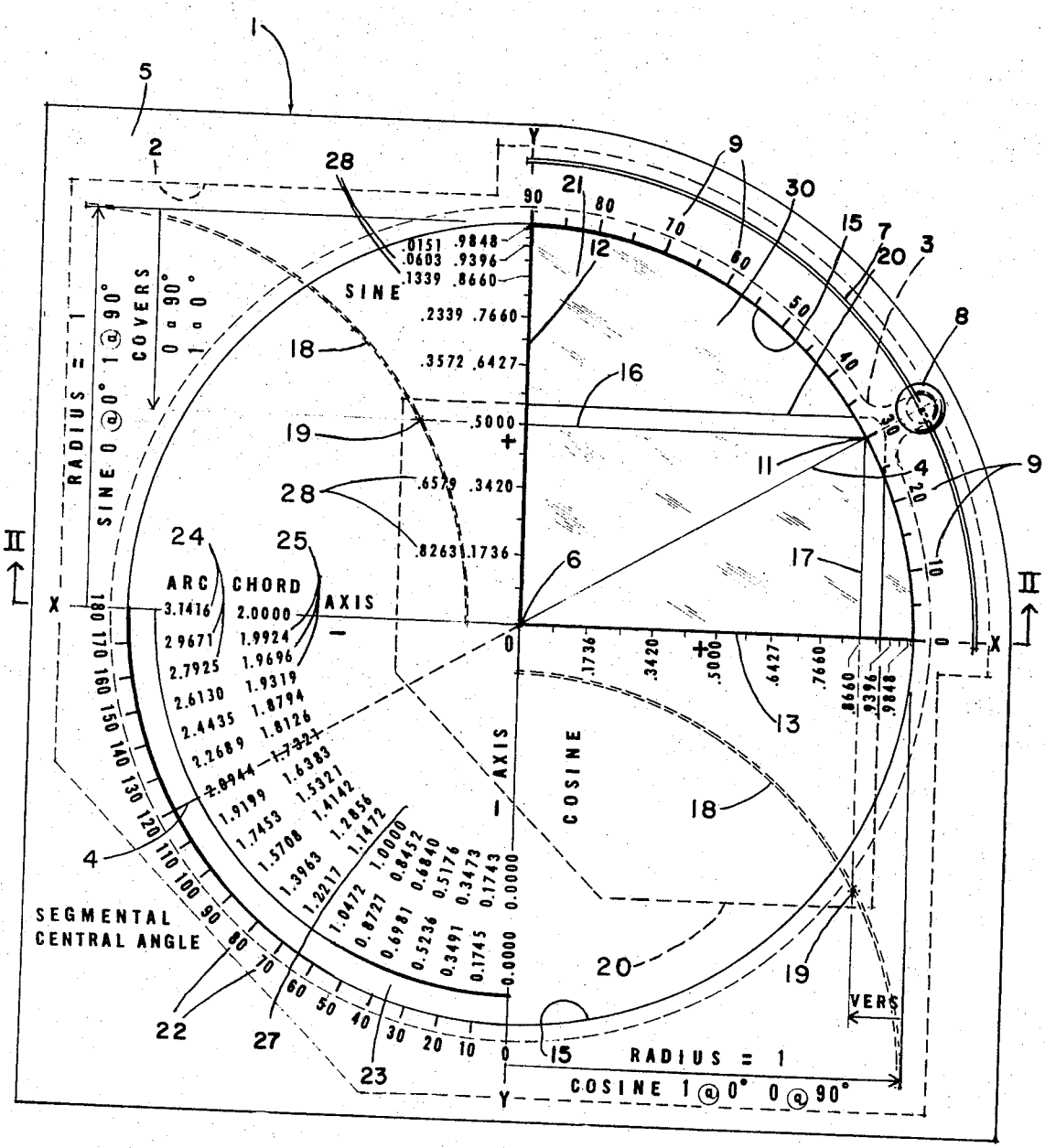
FIG. 1 is a plan view of one presently preferred embodiment of my invention.

Referring now to the specific details of the drawings, FIG. 1 shows a presently preferred embodiment of my device which is useful for demonstrating and calculating sine, cosine, coversine and versine functions. In addition, the device shown in FIG. 1 is also useful for determining segmental central angles along with their corresponding arc lengths and chord lengths. The device comprises a flat planar member 1 which may be constructed of a plastic material such as used in the construction of circular slide rules and the like. Planar member 1 has an upper surface 5 and a lower surface 10, each disposed on opposite faces thereof. A unit circle 15 is imprinted or inscribed on upper surface 5 of planar member 1. Planar member 1 has an ordinate axis 12, vertically extending outwardly from the origin 6 of unit circle 15, also commonly referred to as the Y axis. Planar member 1 also has an abscissa axis 13, referred to as the X axis, imprinted or inscribed thereon and outwardly extending from the origin 6 in a horizontal direction, perpendicular to ordinate axis 12. Angular scale 9 is positioned adjacent the permeter of unit circle 15 to indicate the inscribed angles of an arc measured within a first quadrant 21 of unit circle 15 having numerical indicia associated therewith calibrated from 0° at abscissa axis 13, to 90° at ordinate axis 12.

Figure 2:
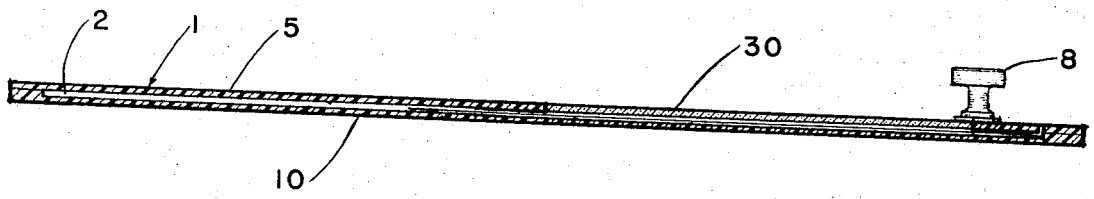
FIG. 2 is a sectional view taken along line II—II of FIG. 1.

In the sectional view of FIGS. 2 and 3 it can be seen that planar member 1 has an open interior 2 between its upper surface 5 and lower surface 10. A cursor member 3 having a radius vector hairline 4 extending thereon is pivotally mounted within interior 2 at origin 6 of unit circle 15 with the radius vector hairline 4 passing through origin 6. The pivotal connection at origin 6 may be made with a small pin or rivet 26 or other conventional connector. Pin 26 is positioned in the lower surface 10 of planar member 1, FIG. 3. Upper surface 5 has a slotted portion 7 through which cursor adjustment knob 8 extends. Slot 7 extends a distance at least 90° to permit the pivotal movement of cursor 3 through at least the 90° quadrant of first quadrant 21. Knob 8 may be threadably attached to cursor member 3 by pin 14 to allow the cursor member 3 to be threadably locked in position at any given angle on angular scale 9. If cursor member 3 is to be moved, knob 8 is threadably loosened within slot 7 and moved to a different angular value and resecured by reverse rotative movement. Hence, the arc of an angle inscribed by radius vector hairline 4 within first quadrant 21 may be visually observed on angular scale 9 by observing the point of intersection of hairline 4 with the angular indicia of scale 9. As shown in FIG. 1, cursor member 3 is in the form of a circular disc having a diameter slightly greater than that of unit circle 15; however, cursor member 3 could also be formed as an elongated member, if desired.

The area of the upper surface 5 in which first quadrant 21 is positioned, i.e., that portion of unit circle 15 lying between abscissa axis 13 and ordinate axis 12 and a 90° arc of unit circle 15, is preferably open or contains a transparent cover 30 to permit visual observation of the radius vector hairline therein. Upper surface 5 adjacent quadrant 21 is preferably opaque to lessen the opportunity of confusion for the student. In this manner, only the functioning portions of the hairlines are visable within quadrant 21.

A flat, transparent indicator member 20 is positioned within open interior portion 2 of planar member 1 and is pivotally connected to cursor member 3. Flat indicator member 20 has two intersecting perpendicular hairlines 16 and 17 inscribed thereon. Flat indicator member 20 is pivotally mounted to cursor member 3 using a pin or a rivet or the like connector at point of intersection 11 of the perpendicular hairlines 16 and 17. The pivotal connection 11 is made along radius vector hairline 4 one unit length from origin 6 of unit circle 15; one unit length being defined as the radius of the unit circle.

Planar member 1 also contains a pair of alignment tracks 18 on the interior side of upper surface portion 5, FIG. 3. Alignment tracks 18 are formed to describe 90° arcs of unit circle 15 and are positioned in spaced apart relationship in quadrants adjacent first quadrant 21. Flat indicator member 20 also has a pair of alignment pins 19 attached thereto, extending upwardly therefrom. The upper ends of pins 19 are movably positioned within each of said alignment tracks 18 to maintain the angular alignment of flat indicator 20 when cursor member 3 is pivotally moved through the 90° quadrant 21 of unit circle 15. Alignment pins 19 are preferably positioned at the terminal ends of hairlines 16 and 17. In this regard, I have found that there is improved slidability between flat indicator member 20 and cursor member 3 when indicator member 20 is positioned between cursor member 3 and upper surface portion 5. When cursor member 3 is moved through first quadrant 21, alignment pins 19 slidably move within alignment tracks 18 to maintain hairline 16 and 17 in perpendicular relationship to the ordinate and abscissa axes 12 and 13 respectively. In order to permit free movement of flat indicator 20 within open interior 2, pivotal connection 26 of cursor 3 should preferably be made at the lower surface 10 of planar member 1 so that flat indicator member 20 is free to move above cursor member 3 and pivotal connection 26, FIG. 3.

Numerical indicia for determining sine and cosine values are positioned adjacent ordinate and abscissa axes 12 and 13, said indicia being linearly calibrated from 0 at origin 6 to 1 at the perimeter of unit circle 15. The sine value of an inscribed angle within first quadrant 21 of circle 15 is demonstrated by the length of hairline 17 from pivotal intersection point 11 to its point of intersection with abscissa axis 13. As stated, the length of line 17 is the value of the sine of the inscribed angle, which sine value may be read directly from the ordinate axis 12 at its point of intersection with perpendicular hairline 16. Conversely, the cosine value of an inscribed angle within first quadrant 21 is determined by the length of hairline 16 from pivotal intersection point 11 to its point of intersection with ordinate axis 12. The cosine value may be directly read on the abscissa axis 13 at the point of intersection with perpendicular hairline 17. As can be seen in FIG. 1, radius vector hairline 4 is positioned at 30° on scale 9. The sine value for 30° is the length of hairline 17 which is shown on the ordinate axis 12 as the value 0.5000. The corresponding cosine value for 30° is determined by the length of hairline 16 which value can be read directly on the abscissa axis 13 and is shown as 0.8660.

The device may also contain additional numerical indicia in order to permit the demonstration and calculation of coversine and versine functions. Coversine functions are based upon the difference between the value 1 and the sine value. Hence, the coversine indicia 28 are calibrated from 0 at the perimeter of the unit circle 15 to 1 at its origin 6 along ordinate axis 12. Conversely, versine functions relate to the difference between the value 1 and the cosine value of a given inscribed angle. Hence, the versine numerical indicia are linearly calibrated along abscissa axis 13 from 0 at the perimeter to 1 at ordinate 6. For the purpose of illustration, FIG. 1 only shows the inclusion of coversine indicia 28 along ordinate axis 12.

In the preferred embodiment of FIG. 1, I have shown first quadrant 21 as a cutout portion through upper surface 5. A transparent cover 30 of plastic or the like transparent material may be positioned within the confines of first quadrant 21 so that the student can visually observe only the workable parts of hairlines 4, 16, and 17. Due to the fact that the quadrants adjacent first quadrant 21 are opaque, the student cannot see those portions of hairline 16 and 17 which extend beyond abscissa and ordinate axes 13 and 12 and, hence, there is much less opportunity for confusing the novice student of trigonometry. Likewise, the alignment tracks 18 and alignment pins 19 serve to maintain the perpendicular relationship of hairlines 16 and 17 with ordinate axis 12 and abscissa 13, respectively, thus eliminating another potential source of confusion and mistake for the novice student. By using my device, the student can come to understand the dynamic relationship between these trigonometric functions and visually determine that the sine values range from 0 at 0° to 1 at 90°; cosine values vary from 1 at 0° to at 90°; versine values vary from 0 at 0° to 1 at 90°; and coversine values vary from 1 at 0° to 0 at 90°.

While my device may be used as just described, it may also contain additional mathematical information relating to segmental functions, particularly, central angles and their related arc and chord lengths. The diagram of FIG. 4 shows the relationship of the segmental central angle to the inscribed angle theta ($\phi$), of first quadrant 21. The segmental central angle is defined by the formula $180° - 2(\phi)$, shown on the diagram at angle GAB. The chord of the central angle is shown as line GEB and the arc of the central angle is the arc GFB. It can be appreciated that these segmental functions are closely related to the trigonometric functions previously described in that the central angle bears a direct relationship to the inscribed angle theta within first quadrant 21; the length of cord GEB of the segmental central angle is equal to twice the cosine of angle theta; and the height of the arc of segmental central angle GAB, defined as length EF, is equal to the coversine of inscribed angle theta. These additional mathematical functions may be included on planar member 1 as shown in FIG. 1. In this embodiment, radius vector hairline 4 is of a length at least as great as the diameter of unit circle 15 so that it may extend into second quadrant 27. Second quadrant 27 of unit circle 15 is positioned diagonally opposite that of first quadrant 21. Planar member 1 has a cutout portion 23 through upper surface 5 positioned adjacent the 90° arc of unit circle 15, within second quadrant 27. A segmental central angle scale 22 is positioned adjacent the perimeter of second quadrant 27 and has associated therewith numerical indicia linearly calibrated from 0 at ordinate axis 12 to 180° at abscissa axis 13. The segmental central angle corresponding to an angle theta inscribed by radius vector hairline 4 within first quadrant 21 may be determined by visual observation of the point of intersection of radius vector hairline 4 with segmental central scale 22. As can be seen in FIG. 1, the inscribed angle theta within first quadrant 21 is shown as 30° and its corresponding segmental central angle is shown on scale 22 as 120°. Additional numerical indicia may also be positioned adjacent segmental central scale 22 in order to indicate the length of arcs and chords corresponding to various segmental central angles. In this regard, numerical indicia 24 representing the lengths of arcs for the various central angles between 0 and 180° are shown. This indicia ranges between the values of 0 at 0° to a value of 3.1416 at 180°. Likewise, numerical indicia 25 may be positioned on upper surface 5 adjacent the arc indicia 24 in order to allow the student to determine the length of chords for the various segmental central angles. The numerical indicia 25 for chord lengths ranges between the value 0 at 0° to the value 2.000 at 180°.

It is understood that my device may be embodied such that sines, cosines, coversines, and versines are demonstrated and calculated alone or the device of my invention may also contain the addition of the segmental central angle and its related functions. In this latter embodiment, the student will come to understand the close relationship of trigonometry with the functions of segments, arcs and chords within the basic unit circle. My demonstrator is, therefore, designed to show the student the basis upon which the functions of both trigonometry and circular segments and arcs are formed.

While several of the presently preferred embodiments of my invention have been shown and described herein, it is clear that minor modifications could be made without departing from the scope of the appended claims.

I claim:

1. A device for demonstrating and calculating mathematical functions comprising:
   a. A flat planar member including upper and lower surfaces disposed on opposite flat faces thereof, said planar member having an open interior portion between said surfaces and including a unit circle disposed on the upper surface with ordinate and abscissa axes positioned on said circle extending perpendicularly from the origin of said circle, said ordinate and abscissa axes having numerical indicia associated therewith, linearly calibrated from 0 at the origin of the unit circle to 1 at its perimeter, said distance defining one unit length, said planar member also including an angular scale to indicate the inscribed angle of an arc within a first 90° quadrant of the unit circle the interior portion of said planar member being visually observable within said first quadrant, said planar member also having a pair of alignment tracks formed on the interior side of the upper surface, said alignment tracks formed to describe 90° arcs of the unit circle and positioned in spaced apart relationship each passing through diagonally opposite quadrants adjacent said first quadrant;
   b. a cursor member having a radius vector hairline of at least one unit length inscribed thereon, said cursor pivotally mounted within the open interior portion of the planar member at the origin of the unit circle with the radius vector hairline passing through said origin;
   c. a flat, transparent indicator member having two intersecting perpendicular hairlines of at least one unit length inscribed thereon, said indicator member pivotally mounted to the radius vector hairline of the cursor member, one unit length from the origin of said circle at the point of intersection of the two perpendicular hairlines, said indicator member positioned between said cursor member and the upper surface of the planar member, said indicator member also including a pair of alignment pins attached thereto and upwardly extending therefrom, each of said pins slidably positioned within one of said alignment tracks, whereby said pair of hairlines remain perpendicular to the ordinate and abscissa axes respectively when said cursor member and flat indicator member are moved through the first quadrant of said unit circle to permit vessel observation of the sine and cosine values of an inscribed angle at the points of intersection of the pair of perpendicular hairlines with the ordinate and abscissa axes respectively.

2. The device of claim 1 including additional numerical indicia positioned adjacent the abscissa and ordinate axes, said indicia linearly calibrated from 1 at the origin of the circle to 0 at its perimeter to permit visual observation of coversine and versine values at the intersection of the perpendicular hairlines of the indicator member with the ordinate axis and abscissa axis respectively.

3. The device of claim 1 wherein the radius vector hairline is of a length at least as great as the diameter of the unit circle, said planar member including a segmental central angle scale positioned adjacent the perimeter of a second quadrant of the circle, said second quadrant diagonally adjacent the aforementioned first quadrant, said planar member including a cutout portion through the upper surface thereof positioned adjacent said central angle scale to permit visual observation of the radius vector hairline therethrough, said segmental central angle scale also having numerical indicia associated therewith, said indicia linearly calibrated from 0° at the ordinate axis to 180° at the abscissa axis, whereby a segmental central angle corresponding to an angle inscribed by the radius vector hairline within the first quadrant may be determined by visual observation of the point of intersection of the radius vector hairline with the segmental central angle scale of the second quadrant.

4. The device of claim 3 including numerical indicia positioned adjacent the segmental central angle scale of the second quadrant for indicating the arc length and chord length for a plurality of segmental central angles between the values of 0° and 180°.

5. The device of claim 1 including a transparent cover positioned within said first quadrant.

* * * * *

UNITED STATES PATENT OFFICE
CERTIFICATE OF CORRECTION

Patent No. 3,835,298  Dated September 10, 1974

Inventor(s) Joseph D. DeAndrea

It is certified that error appears in the above-identified patent and that said Letters Patent are hereby corrected as shown below:

In the Abstract - Lines 1 and 2

--mathemetical-- should read --mathematical--.

Column 1 Line 9, --device-- should read --a device--.
Column 1 Line 40, --Briefly.-- should read --Briefly,--.

Column 2 Line 11, --of unit circle-- should read
--of the unit circle--.
Column 2 Lines 24 and 25,
delete--Said central angle scale is calibrated from 0° to 180° within one quadrant of said circle.-- and insert --circle diagonally opposite the angular scale of the aforementioned inscribed angle.--.

Column 2 Line 67 --angles-- should read --angle--.
Column 3 Line 48 --at point-- should read --at the point--.
Column 5 Line 6 -- to at 90° -- should read --to 0 at 90° --

Signed and sealed this 31st day of December 1974.

(SEAL)
Attest:

McCOY M. GIBSON JR.
Attesting Officer

C. MARSHALL DANN
Commissioner of Patents